3,458,451
EUROPIUM ACTIVATED PHOSPHORS CONTAINING LITHIUM FLUORIDE AND METHOD FOR PREPARING THE SAME
Yoshichika Kobayashi, Ibaragi-shi, Mutsuo Masuda, Kyoto, and Setsuko Murayama and Hideo Mizuno, Takatsuki-shi, Japan, assignors to Matsushita Electronics Corporation, Osaka, Japan, a corporation of Japan
Filed Dec. 20, 1965, Ser. No. 515,083
Claims priority, application Japan, Dec. 28, 1964, 40/22
Int. Cl. C09k 1/10
U.S. Cl. 252—301.4                2 Claims

ABSTRACT OF THE DISCLOSURE

Phosphors having a high efficiency, good particle size distribution and outstanding crystallization properties can be prepared from a rare earth oxide as a host material, europium as an activator and lithium fluoride by firing a mixture thereof at a temperature between 1000° C. and 1150° C.

---

This invention relates to europium-activated phosphors. An object of the invention is to provide high efficiency phosphors for cathode ray tube screens or fluorescent discharge lamps.

Phosphors of the type such as europium-activated lanthanum oxide, europium-activated gadolinium oxide and europium-activated yttrium oxide are already known.

In general phosphors must be fired at a temperature which is about ⅔ of the absolute temperature of the melting point to get sufficient crystallization within a time of some hours. Thus, lanthanum oxide, gadolinium oxide or yttrium oxide which have melting point of about 2300° C. should be fired at 1400°–1500° C. It has been confirmed experimentally that europium-activated rare-earth oxide phosphors such as these show high brightness when fired above 1300° C. However, the firing at such a high temperature has many disadvantages. This is especially true in the case of gadolinium oxide, which has a transition point at 1350° C. Below 1350° C. it is of the cubic system, and above 1350° C. it transits to the monoclinic system. The cubic system is desirable in a host crystal of phosphors for bright fluorescence. To prevent this transition, and thus to obtain high efficiency phosphors, gadolinium oxide should be fired below 1350° C. This low temperature firing needs flux. The velocity of crystallization can be increased by adding a chemical additive—hereafter called flux—to the phosphor, prior to the firing. Such a flux should: (1) accelerate the crystallization of these rare-earth oxides (2) accelerate the diffusion of europium into the host crystals and (3) not quench the europium fluorescence.

In colour cathode ray tubes fine particles of phosphors decrease the colour purity and give rise to poor adhesion of the colour dots to the screen.

Figure 1:
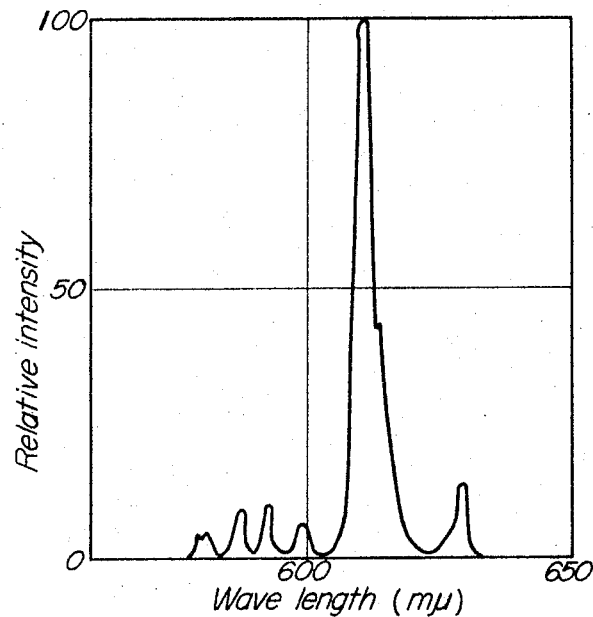
Figure 2:
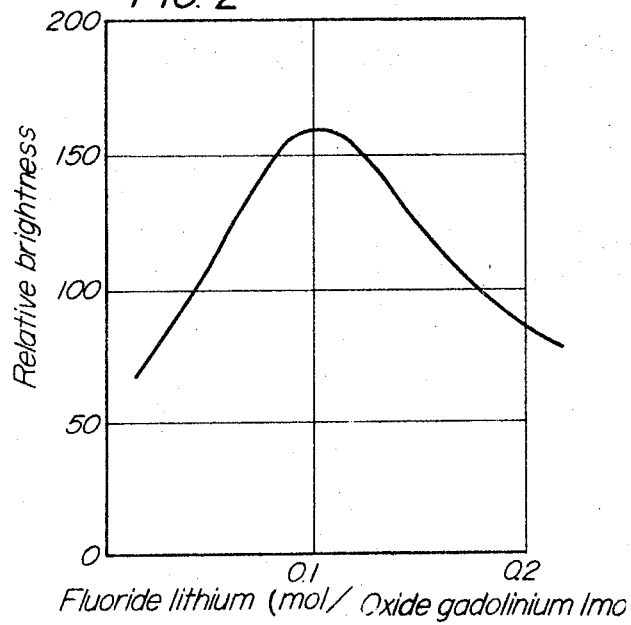

It has now been found that high efficiency, good particle size distribution and sufficient crystallization of europium-activated lanthanum oxide, europium activated lanthanum oxide, europium activated gadolinium oxide and europium activated yttrium oxide phosphors can be obtained by adding a small quantity of lithium fluoride as a flux and firing at about 1200° C. These europium activated rare-earth oxide phosphors show under cathode ray excitation a line emission with a large peak at 6100 A. as shown in FIG. 1. In FIG. 2 is shown a graph based on the quantity of lithium fluoride versus relative brightness of phosphors fired at 1100° C. for 6–8 hours. The vertical axis of FIG. 2 shows relative brightness of the phosphor which is fired at 1200° C. for six hours without lithium fluoride. Europium-activated gadolinium oxide phosphors fired at 1100° C. with 0.1 mol lithium fluoride show 250% brightness as compared with the one which is fired by same firing conditions but without lithium fluoride, and show 160% brightness as compared with the one which is fired at 1200° C. for six hours. Moreover crystal growth is accelerated and crystallization is improved by adding lithium fluoride as well as the relative amount of fine particles decreases. Particle size of phosphors fired at 1100° C. with lithium fluoride is larger than the one fired at 1200° C. without lithium fluoride. This larger particle size improves colour purity and adhesive quality of the powder for application in cathode ray tubes. Europium-activated lanthanum oxide, europium-activated gadolinium oxide and europium-activated yttrium oxide phosphors or phosphors comprising a mixture of at least two of the said oxides can be fired at 1000°–1150° C. when it contains a small quantity of lithium fluoride as a flux, resulting in a high efficiency phosphor. As the raw material, not only the oxide of lanthanum, gadolinium, yttrium and europium, but also the compounds of these rare-earth such as carbonate or oxalate which produce oxide during the firing reaction can be used.

To obtain a good brightness, the ratio of gram atoms of europium to gram mols of lanthanum, gadolinium or yttrium oxide or their mixture should be between 0.002:1 and 0.3:1 and preferably between 0.04:1 and 0.15:1. To obtain the maximum improvement in brightness the ratio of gram mols of lithium fluoride to gram mols of lanthanum, gadolinium and yttrium oxide should be between 0.003:1 and 0.3:1 and preferably between 0.05:1 and 0.15:1.

Following are specific examples for preparing phosphors of this invention. It is to be understood, however, that the invention is not limited thereto.

Example 1

| Raw-mix constituents: | Amount (mols) |
|---|---|
| $Gd_2O_3$ | 1.0 |
| $Eu_2O_3$ | 0.03 |
| LiF | 0.1 |

The foregoing components are thoroughly mixed and fired at 1000°–1150° C. for 4–6 hours. The phosphors thus prepared show brilliant red emission under 2537 A. ultra-violet ray or under cathode ray excitations. The emission spectrum by cathode ray excitations are shown in FIG. 1.

Example 2

| Raw-mix constituents: | Amount (mols) |
|---|---|
| $Y_2O_3$ | 1.0 |
| $Eu_2O_3$ | 0.05 |
| LiF | 0.1 |

The foregoing components are thoroughly mixed and fired at 1000°–1150° C. for 4–6 hours. The phosphors thus prepared show brilliant red emission under 2537 A. ultra-violet ray or under cathode ray excitations.

Example 3

| Raw-mix constituents: | Amount (mols) |
|---|---|
| $La_2O_3$ | 1.0 |
| $Eu_2O_3$ | 0.04 |
| LiF | 0.1 |

The foregoing components are thoroughly mixed and fired at 1000°–1150° C. for 4–6 hours. The phosphors thus prepared show brilliant red emission under 2537 A. ultra-violet ray or under cathode ray excitations.

Example 4

| Raw-mix constituents: | Amount (mols) |
|---|---|
| $Gd_2O_3$ | 0.5 |
| $Y_2O_3$ | 0.5 |
| $Eu_2O_3$ | 0.04 |
| LiF | 0.1 |

The foregoing components are thoroughly mixed and fired at 1000°–1150° C. for 4–6 hours. The phosphors thus prepared show brilliant red emission under 2537 A. ultra-violet ray or under cathode ray excitations.

Example 5

| Raw-mix constituents: | Amount (mols) |
|---|---|
| $Gd_2O_3$ | 1.0 |
| $EuF_3$ | 0.08 |
| LiF | 0.1 |

The foregoing components are thoroughly mixed and fired at 1000°–1150° C. for 4–6 hours. The phosphors thus prepared show brilliant red emission under 2537 A. ultra-violet ray or under cathode ray excitations.

Example 6

| Raw-mix constituents: | Amount (mols) |
|---|---|
| $(Gd_{1.0} Eu_{0.03})_2 \begin{pmatrix} COO \\ | \\ COO \end{pmatrix}_{3.09}$ | 1.0 |
| LiF | 0.1 |

The foregoing components are thoroughly mixed and fired at 1000°–1150° C. for 4–6 hours. The phosphors thus prepared show brilliant red emission under 2537 A. ultra-violet ray or under cathode ray excitations.

What we claim is:

1. A method for producing an europium activated phosphor comprising at least one member selected from the group consisting of gadolinium oxide, yttrium oxide and lanthanum oxide as a host material and europium as an activator, said europium being contained in a proportion of 0.002 to 0.3 mol per mol of said host material, comprising the steps of adding 0.003 to 0.3 mol of lithium fluoride per mol of said host material to a mixture of said host oxide and activator and firing the mixture at a temperature in the range between 1000° C. and 1150° C.

2. A method as defined in claim 1 wherein the amount of lithium fluoride added is 0.05 to 0.15 mol per mol of said host material.

References Cited

UNITED STATES PATENTS

| 3,250,722 | 5/1966 | Borchardt | 252—301.4 |
| 3,368,980 | 2/1968 | Avella et al. | 252—301.4 |

TOBIAS E. LEVOW, Primary Examiner

R. D. EDMONDS, Assistant Examiner